(12) United States Patent
Vinogradov

(10) Patent No.: US 7,793,840 B2
(45) Date of Patent: Sep. 14, 2010

(54) IMAGING ZOOM LENS ASSEMBLY FOR AN IMAGING-BASED BAR CODE READER

(75) Inventor: Igor Vinogradov, New York, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 165 days.

(21) Appl. No.: 12/044,724

(22) Filed: Mar. 7, 2008

(65) Prior Publication Data

US 2009/0224051 A1 Sep. 10, 2009

(51) Int. Cl.
*G06K 7/10* (2006.01)
*G06K 7/14* (2006.01)

(52) U.S. Cl. ............... 235/454; 235/462.2; 235/462.22; 235/462.23; 235/462.24; 235/462.32

(58) Field of Classification Search ............. 235/454, 235/462.2, 462.22, 462.23, 462.24, 462.32
See application file for complete search history.

(56) References Cited

U.S. PATENT DOCUMENTS

| | | | | |
|---|---|---|---|---|
| 3,848,967 | A * | 11/1974 | Grey | 359/677 |
| 4,936,661 | A * | 6/1990 | Betensky et al. | 359/692 |
| 5,233,431 | A * | 8/1993 | Yoshida et al. | 348/342 |
| 5,378,883 | A * | 1/1995 | Batterman et al. | 235/462.21 |
| 5,537,254 | A * | 7/1996 | Ruben | 359/682 |
| 5,630,181 | A * | 5/1997 | Ohtake | 396/72 |
| 5,756,981 | A * | 5/1998 | Roustaei et al. | 235/462.42 |
| 6,324,296 | B1 * | 11/2001 | McSheery et al. | 382/107 |
| 6,405,925 | B2 | 6/2002 | He et al. | |
| 7,142,368 | B2 * | 11/2006 | Kim et al. | 359/666 |
| 7,180,673 | B2 * | 2/2007 | Dowski, Jr. | 359/637 |
| 7,303,131 | B2 | 12/2007 | Carlson et al. | |
| 2004/0080655 | A1 * | 4/2004 | Watanabe et al. | 348/335 |
| 2009/0168198 | A1 * | 7/2009 | Perreault | 359/694 |

OTHER PUBLICATIONS

Rudolf Kingslake, *Lens Design Fundamentals* (book), Copyright 1978, pp. 60 & 61, Academic Press, Inc., San Diego, CA.

* cited by examiner

*Primary Examiner*—Daniel A Hess
*Assistant Examiner*—Ali Sharifzada

(57) ABSTRACT

A variable focus imaging lens assembly for an imaging-based bar code reader for imaging a target bar code within a field of view of the imaging system, the imaging lens assembly comprising a simplified zoom lens assembly or system that provides for both focusing and adjustment of focal length of the imaging lens assembly with movement of a single group of movable lenses using one motor. The zoom lens assembly includes a stationary lens group comprising a plurality of stationary lenses and a movable lens group comprising a plurality of movable lenses movable with respect to a sensor array of the imaging system. The movable lens group is driven by a motor along a path of travel parallel to an optic axis of the imaging lens assembly, at least one lens of the plurality of stationary lenses being intermediate a pair of lenses of the plurality of movable lenses.

22 Claims, 6 Drawing Sheets

IMAGING ZOOM LENS ASSEMBLY FOR AN IMAGING-BASED BAR CODE READER

FIELD OF THE INVENTION

The present invention relates to an imaging lens assembly for an imaging-based bar code reader utilizing a zoom lens system and, more particularly, to a zoom lens system for an imaging-based bar code reader providing for simultaneous focusing and variation of focal length of the lens assembly with movement of a single group of lenses using a single motor.

BACKGROUND ART

Various electro-optical systems have been developed for reading optical indicia, such as bar codes. A bar code is a coded pattern of graphical indicia comprised of a series of bars and spaces of varying widths, the bars and spaces having differing light reflecting characteristics. Some of the more popular bar code symbologies include: Universal Product Code (UPC), typically used in retail stores sales; Data Matrix, typically used for labeling small electronic products; Code 39, primarily used in inventory tracking; and Postnet, which is used for encoding zip codes for U.S. mail. Bar codes may be one dimensional (1D), i.e., a single row of graphical indicia such as a UPC bar code or two dimensional (2D), i.e., multiple rows of graphical indicia comprising a single bar code, such as Data Matrix which comprising multiple rows and columns of black and white square modules arranged in a square or rectangular pattern.

Systems that read bar codes (bar code readers) electro-optically transform the graphic indicia into electrical signals, which are decoded into alphanumerical characters that are intended to be descriptive of the article or some characteristic thereof. The characters are then typically represented in digital form and utilized as an input to a data processing system for various end-user applications such as point-of-sale processing, inventory control and the like.

Bar code readers that read and decode bar codes employing imaging systems are typically referred to as imaging-based bar code readers or bar code scanners. Imaging systems include charge coupled device (CCD) arrays, complementary metal oxide semiconductor (CMOS) arrays, or other imaging sensor arrays having a plurality of photosensitive elements (photosensors) defining image pixels. An illumination apparatus or system comprising light emitting diodes (LEDs) or other light source directs illumination toward a target object, e.g., a target bar code. Light reflected from the target bar code is focused through a system of one or more lens of the imaging system onto the sensor array. Thus, the target bar code within a field of view (FV) of the imaging lens system is focused on the sensor array.

Periodically, the pixels of the sensor array are sequentially read out generating an analog signal representative of a captured image frame. The analog signal is amplified by a gain factor and the amplified analog signal is digitized by an analog-to-digital converter. Decoding circuitry of the imaging system processes the digitized signals representative of the captured image frame and attempts to decode the imaged bar code.

As mentioned above, imaging-based bar code readers typically employ an imaging lens assembly for focusing scattered/reflected light from an object of interest within the field of view (FV) onto the sensor array. If a target object is within the field of view FV, an image of the target object will be focused onto the sensor array.

There are typically two types of imaging lens assemblies: 1) fixed focus lens systems; and 2) variable focus lens systems. In a fixed focus system, the field of view (FV) and a working range (WR) of the imaging system is fixed. The working range (WR) of an imaging system is a distance range in front of or forward of the imaging lens assembly within which a target object of interest, such as a target bar code, may be successfully imaged and decoded by the imaging system decoding circuitry.

The working range (WR) and field of view (FV) require a user to move the bar code reader relative to the target bar code such that the target bar code is within the field of view (FV) and within the working range (WR) of the imaging system for successful decoding of the imaged target bar code. For example, if the target bar code is positioned at a distance that is greater than the working range, the size of the imaged target bar code will be too small and out of focus to be well resolved by the imaging system and therefore to be success fully decoded. That is, the pixels per module (PPM) will be below a threshold value and, therefore, too small to permit successful decoding. PPM is a measure of how many active pixels of a sensor array the smallest feature (bar or stripe) of a target bar code is imaged onto. Additionally, at the near and far limits of the working range (WR), there is a problem with blurriness, that is, poor resolution of the imaged target bar code.

One type of variable focus lens system is an autofocus system, that is, one in which the entire imaging lens assembly moves with respect to a fixed sensor array. This is a fixed focal length lens assembly in which movement of the lens assembly with respect to the sensor array provides for focusing, that is, a sharp image being focused onto the sensor array. Such an autofocus system will permit, for example, sharp focusing of an image of a target bar code at the extremities of the working range (WR).

However, such an autofocus system, while addressing the problem of blurriness at the extremities of the working range, does not address the limitation of the imaging system regarding the PPM threshold value. At distances greater than the far distance of the fixed working range (WR), the PPM value is below the threshold PPM value and the imaged target bar code cannot be decoded regardless of how well the image is focused on the sensor array.

One potential solution to this problem would be to use a particular type of variable focus lens system used in photographic applications and called a zoom lens system. A zoom lens system permits changing of the focal length of the system. This could allow an effective working range (WR) of the imaging system to be increased by changing the focal length of the imaging lens assembly.

In a zoom lens system, typically there are two moving lenses, each of which move independently with respect to one or more stationary lenses. Advantageously, the independent movement of the two lenses allows the focal length (or magnification), as well as the field of view (FV) to be changed.

However, the problem with typical zoom lens systems is that they require, at a minimum, two motors: one motor for the zoom, that is, one motor to drive movement of the movable lenses that effect a change of the focal length; and a second motor for focusing, that is, keeping a sharp image focused onto the sensor array as the focal length is changed. When the focal length changes, the location of the plane where the sharpest image is projected by the imaging lens assembly (the image plane), also changes. Thus, if applied to a bar code reader, there would need to be compensation such that the image plane remains congruent or aligned with the position of the sensor array so that a sharp image of the target bar code is focused on the sensor array surface as the focal length is changed. One way to provide for such focusing is to move the entire lens assembly with respect to the sensor array. Hence, one (or more) motors would be needed for movement of the movable lenses to effect change of focal length, while a second motor would be needed for focusing to keep the image plane aligned with the sensor array. The use of two or more motors creates complexity in the imaging lens system and may require additional time to adjust the position of both lens groups (movable lens assembly and entire lens assembly) to yield a desired image quality for successful decoding.

Since imaging-based bar code readers are typically housed in small housings decreasing the size and complexity of the imaging lens system is desirable. Further since additional drive motors increase the cost of the imaging lens system, decreasing the number of drive motors required for the imaging lens assembly is advantageous.

What is needed is an imaging lens system for an imaging-based bar code reader that has the advantages of a zoom lens system, namely variable focal length and field of view (FV), while being less complex and requiring fewer drive motors than typical photographic zoom lens systems.

SUMMARY

In one aspect, the present invention features a variable focus imaging lens assembly for an imaging-based bar code reader for imaging a target object within a field of view of the imaging system, the imaging lens assembly comprising a simplified zoom lens assembly that provides for both focusing and adjustment of focal length of the imaging lens assembly with movement of a single group of movable lenses using a single motor.

In one exemplary embodiment, the variable focus imaging lens assembly includes:

a variable focus imaging lens assembly for an imaging system of an imaging-based bar code reader for imaging a target bar code within a field of view of the imaging system, the imaging system generating image frames of the field of view and including an imaging sensor array, the variable focus imaging lens assembly defining an optical axis and comprising:

a zoom lens assembly projecting light from the field of view onto the sensor array;

the zoom lens assembly including a stationary lens group comprising a plurality of stationary lenses stationary with respect to the sensor array and a movable lens group comprising a plurality of movable lenses movable with respect to the sensor array, the movable lens group movable along a path of travel parallel to the optic axis, at least one lens of the plurality of stationary lenses being intermediate a pair of lenses of the plurality of movable lenses;

as the movable lens group moves in a first direction along the path of travel, a focal length of the imaging lens assembly increasing and an angle of the field of view decreasing and, as the movable lens group moves in a second direction, opposite the first direction, along the path of travel, the focal length of the imaging lens assembly decreasing and the angle of the field of view increasing, an image plane of the imaging lens assembly remaining substantially aligned with the sensor array during movement of the movable lens group; and a drive mechanism comprising a single drive motor to drive the movable lens group along the path of travel.

In one exemplary embodiment of the imaging lens assembly, the stationary lens assembly includes a first lens comprising a biconcave lens having a negative optic power and a spaced apart second lens comprising an achromatic doublet functioning as a field curvature corrector, the second lens being closer to the sensor array and the first lens being closer to the target bar code.

In one exemplary embodiment of the imaging lens assembly, the movable lens group includes a first lens an achromatic double having a positive optic power and a spaced apart second lens comprising a biconvex lens having a positive optic power, the second lens being closer to the sensor array and the first lens being closer to the target bar code.

In one exemplary embodiment of the imaging lens assembly, the zoom lens assembly includes an aperture stop including an aperture in proximity to the first lens of the stationary lens group.

In one aspect, the present invention features an imaging-based bar code reader. In one exemplary embodiment, the imaging based bar code reader includes:

an imaging system for imaging a target bar code within a field of view of the imaging system, the imaging system generating image frames of the field of view of the imaging system and including an imaging sensor array; and a variable focus imaging lens assembly for projecting light from the field of view onto the sensor array, the variable focus imaging lens assembly defining an optical axis and including:

a zoom lens assembly projecting light from the field of view onto the sensor array;

the zoom lens assembly including a stationary lens group comprising a plurality of stationary lenses stationary with respect to the sensor array and a movable lens group comprising a plurality of movable tenses movable with respect to the sensor array, the movable lens group movable along a path of travel parallel to the optic axis, at least one lens of the plurality of stationary lenses being intermediate a pair of lenses of the plurality of movable lenses;

as the movable lens group moves in a first direction along the path of travel, a focal length of the imaging lens assembly increasing and an angle of the field of view decreasing and, as the movable lens group moves in a second direction, opposite the first direction, along the path of travel, the focal length of the imaging lens assembly decreasing and the angle of the field of view increasing, an image plane of the imaging lens assembly remaining substantially aligned with the sensor array during movement of the movable lens group; and a drive mechanism comprising a single drive motor to drive the movable lens group along the path of travel.

In one exemplary embodiment of the bar code reader, the stationary lens assembly includes a first lens comprising a biconcave lens having a negative optic power and a spaced apart second lens comprising an achromatic doublet functioning as a field curvature corrector, the second lens being closer to the sensor array and the first lens being closer to the target bar code.

In one exemplary embodiment of the bar code reader, the movable lens group includes a first lens an achromatic double having a positive optic power and a spaced apart second lens comprising a biconvex lens having a positive optic power, the second lens being closer to the sensor array and the first lens being closer to the target bar code.

In one exemplary embodiment of the bar code reader, the zoom lens assembly includes an aperture stop including an aperture in proximity to the first lens of the stationary lens group.

These and other objects, advantages, and features of the exemplary embodiments are described in detail in conjunction with the accompanying drawings.

BRIEF DESCRIPTION OF THE DRAWINGS

The foregoing and other features and advantages of the present invention will become apparent to one skilled in the art to which the present invention relates upon consideration of the following description of the invention with reference to the accompanying drawings, in which:

FIG. 10 is a schematic perspective view of a focal point and focal plane at a particular distance from the zoom lens assembly and the corresponding horizontal and vertical fields of view.

DETAILED DESCRIPTION

Figure 1:
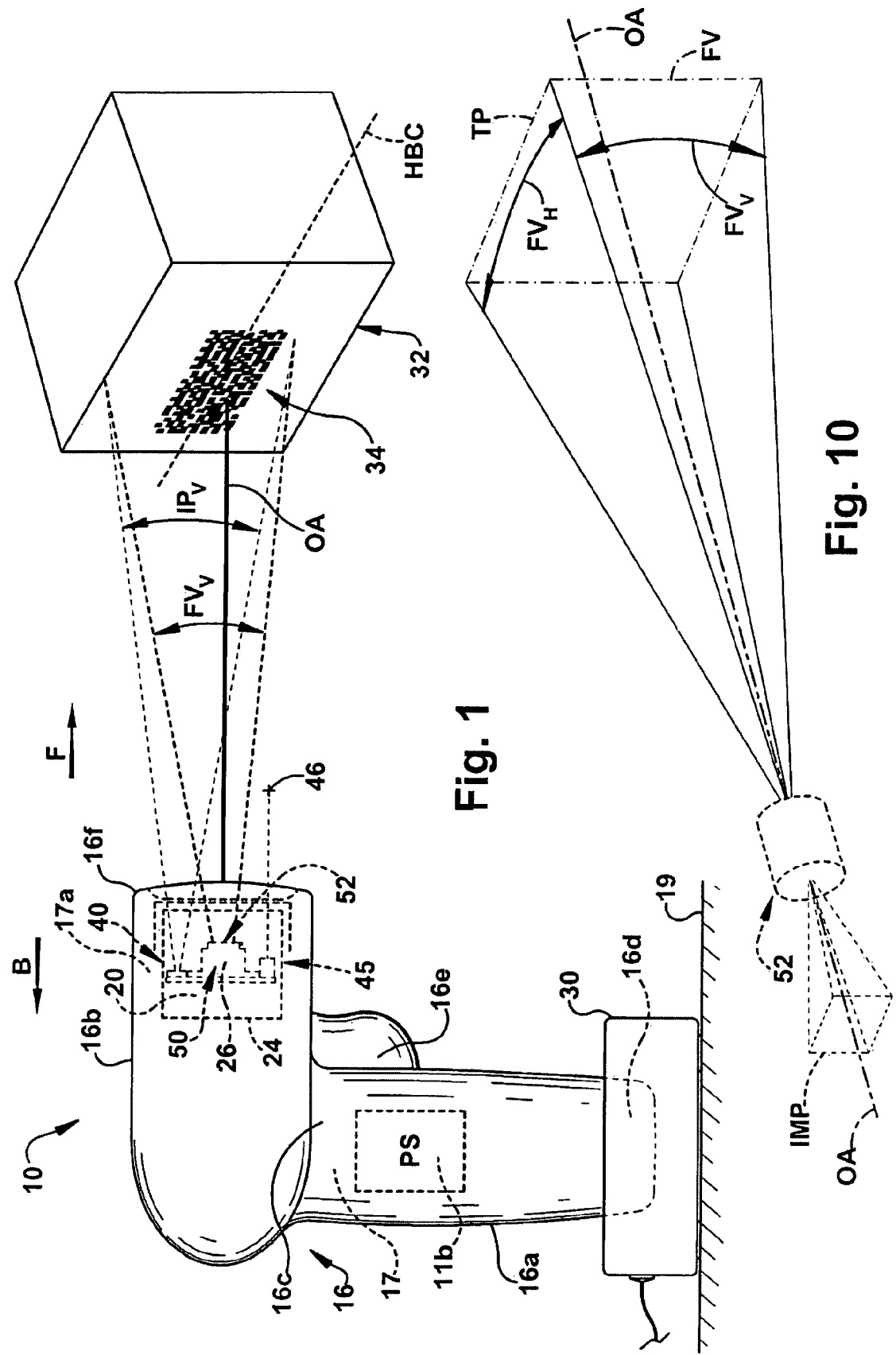
FIG. 1 is a schematic side elevation view of an exemplary embodiment of an imaging-based bar code reader of the present invention.
Figure 2:
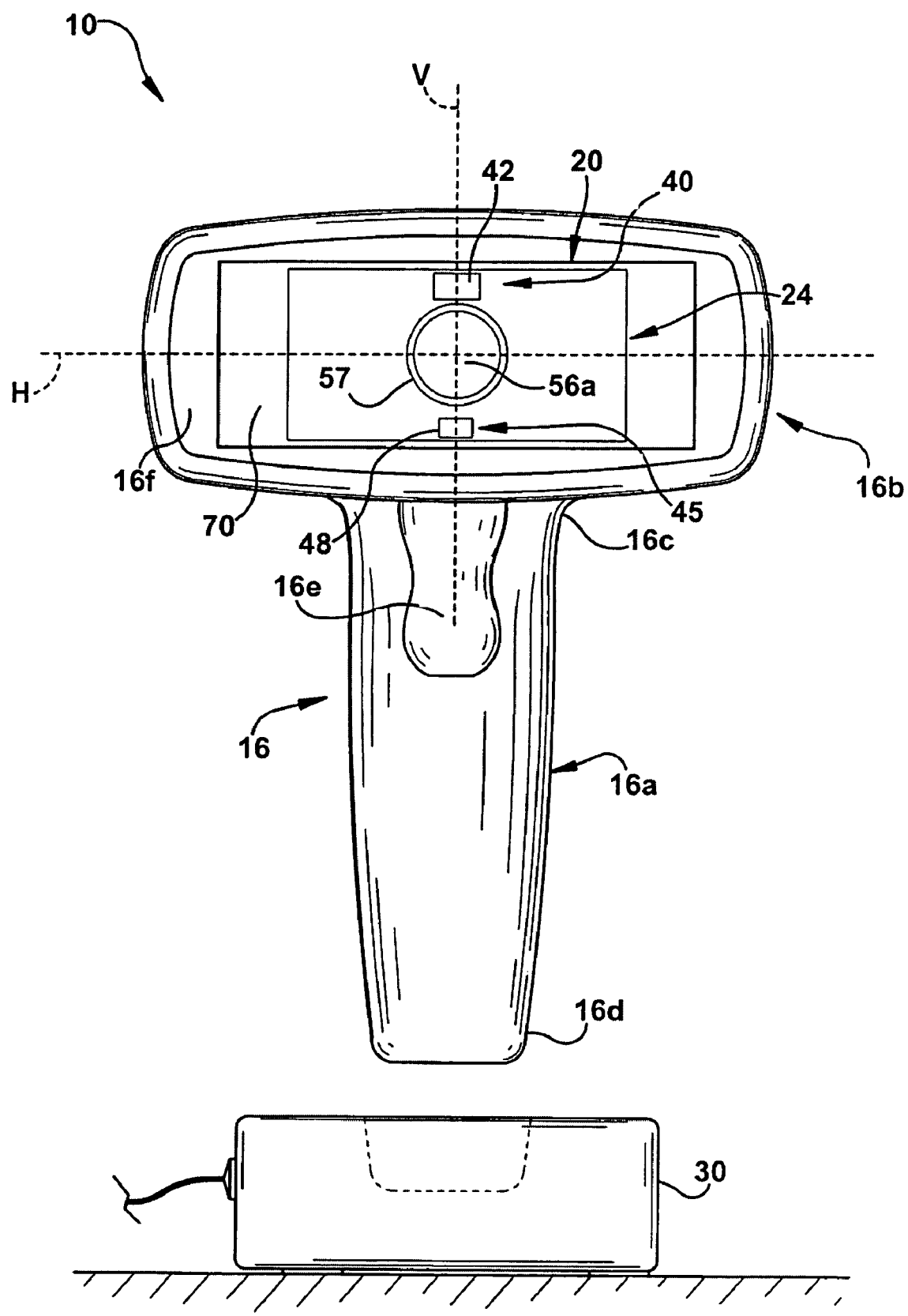
FIG. 2 is a schematic front elevation view of the bar code reader of FIG. 1.

A first exemplary embodiment of an imaging-based bar code reader of the present invention is shown schematically at 10 in FIGS. 1-6. The bar code reader 10 includes an imaging system 12 and a decoding system 14 mounted in a housing 16. The reader 10 is capable of reading, that is, imaging and decoding target objects, such as target bar codes. The imaging system 12 is adapted to capture image frames of a field of view FV of the imaging system 12 and the decoding system 14 is adapted to decode encoded indicia within a captured image frame. The housing 16 supports circuitry 11 of the reader 10 including the imaging and decoding systems 12, 14 within an interior region 17 of the housing 16.

The imaging system 12 comprises a modular scan engine or imaging camera assembly 20 and associated imaging circuitry 22 including a sensor array 28 and a variable focus imaging lens assembly 50. The camera assembly 20 may, but does not have to be, modular in that the camera housing 24 may be removed or inserted as a unit into the reader 10, allowing the ready substitution of camera assemblies having different imaging characteristics, e.g., camera assemblies having different focal distances, working ranges, and fields of view. A working range WR is a distance range in front of or forward (in a direction F in FIG. 1) of the camera assembly 20 within which a target object of interest 32, such as a target bar code 34, may be successfully imaged and decoded.

The imaging camera assembly 20 includes the housing 24, which supports the variable focus imaging lens assembly or system 50 and the sensor array 50. The variable focus imaging lens assembly 50 defines an optical axis OA and projects or focuses illumination from the field of view FV onto the sensor array 28. The imaging lens assembly 50 includes a zoom lens assembly or system 52 which includes a group or set of stationary lenses 54 and a group or set of movable lenses 56. Unlike most photographic zoom lens systems which require multiple drive motors for changing a focal length of the system and for focusing the zoom lens system, advantageously, the zoom lens assembly 52 of the present invention is a simplified system requiring only a single drive motor 62 to drive the movable lens group 56. The drive motor 62 is part of a drive mechanism assembly 60. Another advantage of the zoom lens assembly 52 of the present invention is that a precision stepper motor, often used in photographic zoom lens systems, is not required. Rather a less costly, less precise motor 60, such as, for example, a synchronous DC motor having an accuracy in the range of 100s of microns is sufficient to maintain focus and provide acceptable image quality.

The sensor array 28 is enabled during an exposure period to capture an image of a target object 32, such as a target bar code 34, within a field of view FV of the imaging system 12. The field of view FV of the imaging system 12 is a function of both the configuration of the sensor array 28 and the lens assembly 50 and the distance and orientation between the array 28 and the lens assembly 50.

In one exemplary embodiment, the imaging system 12 is a two dimensional (2D) imaging system and the sensor array 28 is a 2D sensor array. It should be understood, however, that the present invention is equally applicable to a linear or one dimensional imaging system having a 1D linear sensor array.

Figure 3:
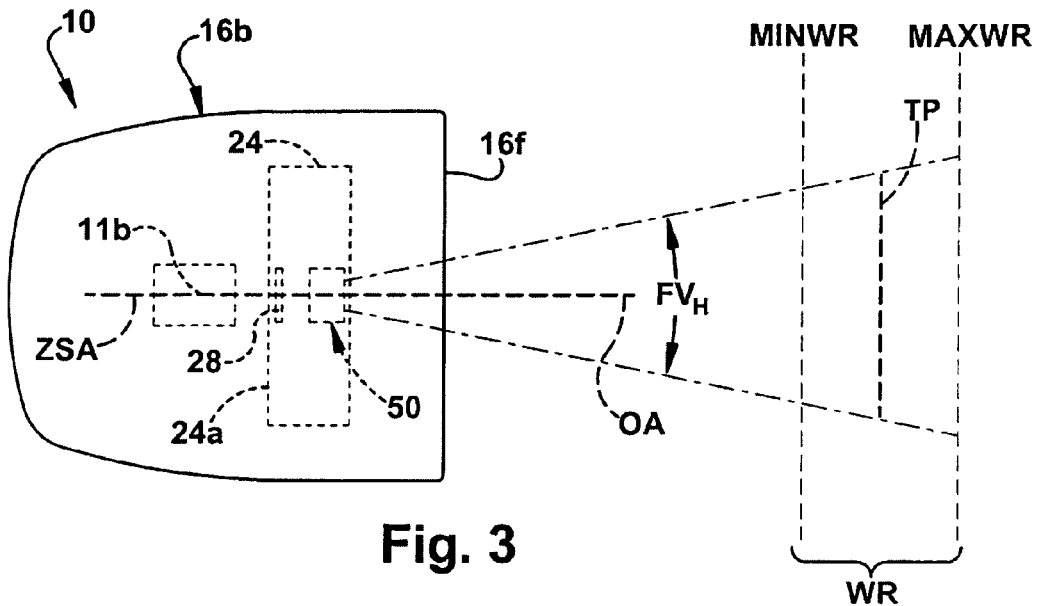
FIG. 3 is a schematic top plan view of the bar code reader of FIG. 1.
Figure 4:
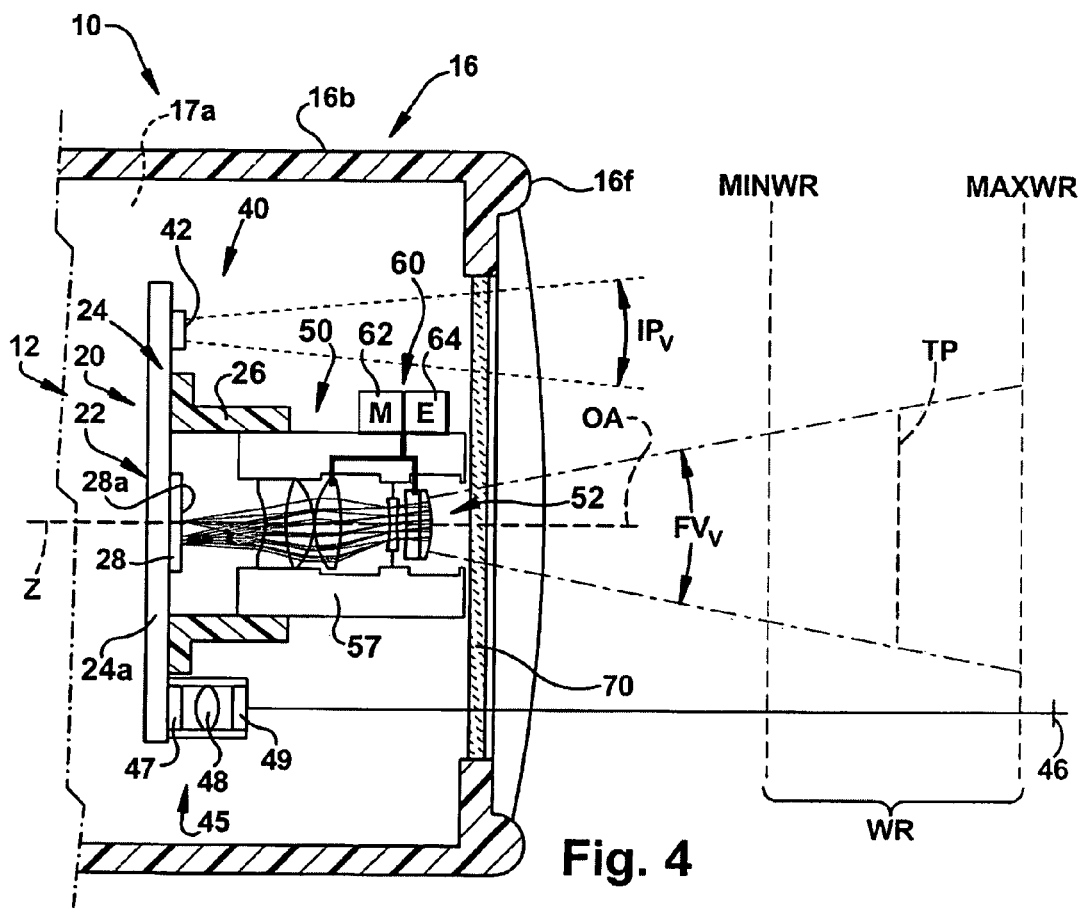
FIG. 4 is a schematic view partly in section and partly in side elevation of a camera assembly of an imaging assembly of the bar code reader of FIG. 1.

The imaging system 12 field of view FV (shown schematically in FIG. 5) includes both a horizontal and a vertical field of view, the horizontal field of view being shown schematically as FVH in FIG. 3 and the vertical field of view being shown schematically as FVV in FIGS. 1 and 4. The sensor array 28 is primarily adapted to image 1D and 2D bar codes, for example, a Data Matrix bar code as shown in FIG. 1 which extends along a horizontal axis HBC and includes multiple rows of indicia comprising a multi-row, multi-column array of dark bars and white spaces. However, one of skill in the art would recognize that the present invention is also applicable to image postal codes, signatures, etc.

The housing 16 includes a gripping portion 16a adapted to be grasped by an operator's hand and a forward or scanning head portion 16b extending from an upper part 16c of the gripping portion 16a. A lower part 16d of the gripping portion 16a is adapted to be received in a docking station 30 positioned on a substrate 19 such as a table or sales counter. The scanning head 16b supports the imaging system 12 within an interior region 17a (FIG. 4) of the scanning head 16b. As can best be seen in FIG. 2, looking from the front of the housing 16, the scanning head 16b is generally rectangular in shape and defines a horizontal axis H and a vertical axis V. The vertical axis V being aligned with a general extent of the gripping portion 16a.

Advantageously, the reader 10 of the present invention is adapted to be used in both a hand-held mode and a fixed position mode. In the fixed position mode, the housing 16 is received in the docking station 30 and the target bar code 34 of the target object 32 (FIG. 1) is brought within the field of view FV of the reader's imaging system 12 in order to have the reader 10 read the target bar code 34. The imaging system 12 is typically always on or operational in the fixed position mode to image and decode any target bar code presented to the reader 10 within the field of view FV. The docking station 30 is plugged into an AC power source and provides regulated DC power to circuitry 11 of the reader 10. Thus, when the reader 10 is in the docking station 30 power is available to keep the imaging system 12 on continuously.

In the hand-held mode, the housing 14 is removed from the docking station 30 so the reader 10 can be carried by an operator and positioned such that the target bar code 34 is within the field of view FV of the imaging system 12. In the hand-held mode, imaging and decoding of the target bar code 34 is instituted by the operator depressing a trigger 16e extending through an opening near the upper part 16c of the gripping portion 16a.

Figure 5:
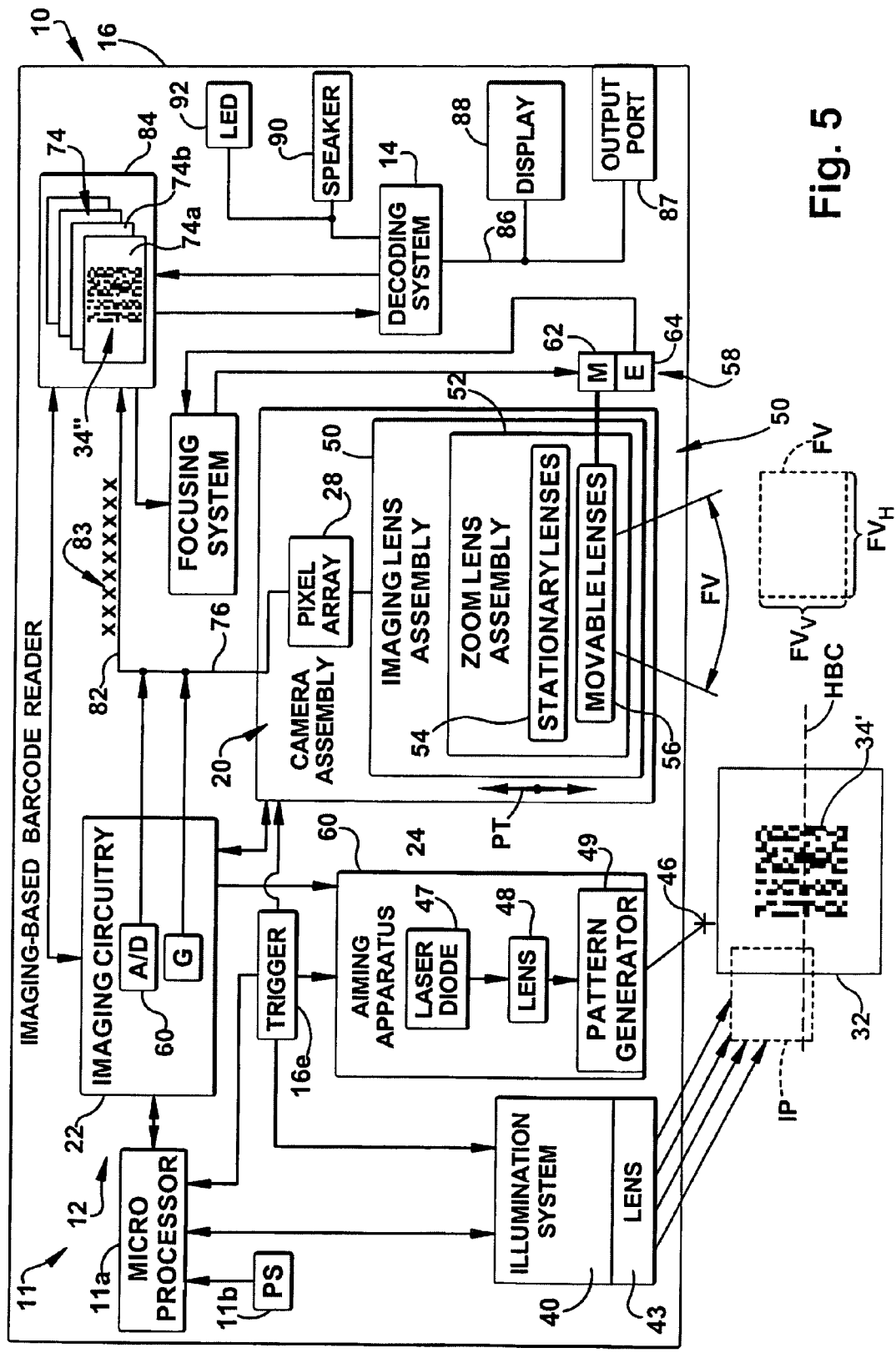
FIG. 5 is a schematic block diagram of the bar code reader of FIG. 1.

The imaging system 12 is part of the bar code reader circuitry 11 which operates under the control of a microprocessor 11a (FIG. 5). When removed from the docking station 30, power is supplied to the imaging and decoding systems 12, 14 by a power supply 11b. The imaging and decoding systems 12, 14 of the present invention may be embodied in hardware, software, electrical circuitry, firmware embedded within the microprocessor 11a or the modular camera assembly 20, on flash read only memory (ROM), on an application specific integrated circuit (ASIC), or any combination thereof as would be understood by one of skill in the art.

Illumination Apparatus 40 and Aiming System 45

The bar code reader 10 includes an illumination apparatus or system 40 to illuminate the field of view FV, including the target bar code 34, and a laser aiming system 45 which generates a visible crosshair aiming pattern 46 (FIGS. 1, 4 and 5) to aid the operator in aiming the reader 10 at the target bar code 34 when using the reader 10 in the hand-held mode.

The aiming system 45 generates the visible aiming pattern 46 comprising, as an example, a dot or a crosshair pattern of illumination. The aiming system 45 typically includes a laser diode 47, a focusing lens 48 and a pattern generator 49 for generating the desired aiming pattern 46. The aiming pattern 46 is disabled when the imaging system 12 images the target bar code 34 to avoid have the aiming pattern appear in the captured image frames 74 and compromise the quality of the imaged target bar code 34a.

The illumination apparatus 40 includes an illumination source 42 (FIGS. 4 and 5) such as a surface mount, red LED (or, alternately, a cold cathode lamp) which is energized to generate an illumination pattern IP (shown schematically in FIG. 5). The generated illumination pattern IP fills or substantially coincides with the field of view FV of the imaging system 12. While the illumination assembly 40 shown in the exemplary embodiment of the reader 10 includes a single LED that emits red illumination in the visible spectrum (approximately 620-750 nanometers), it should be understood that depending on the specifics of the reader and the environmental conditions under which the reader will be used, a more sophisticated illumination assembly 40 may be utilized differing illumination wavelengths and/or focusing optics.

The imaging circuitry 22 may be disposed within, partially within, or external to the camera assembly housing 24. A back end of the housing 24 may be comprised of a printed circuit board 24a, which forms part of the imaging circuitry 22 and extends vertically to also support the illumination source 42 best seen in FIG. 4).

Figure 6:
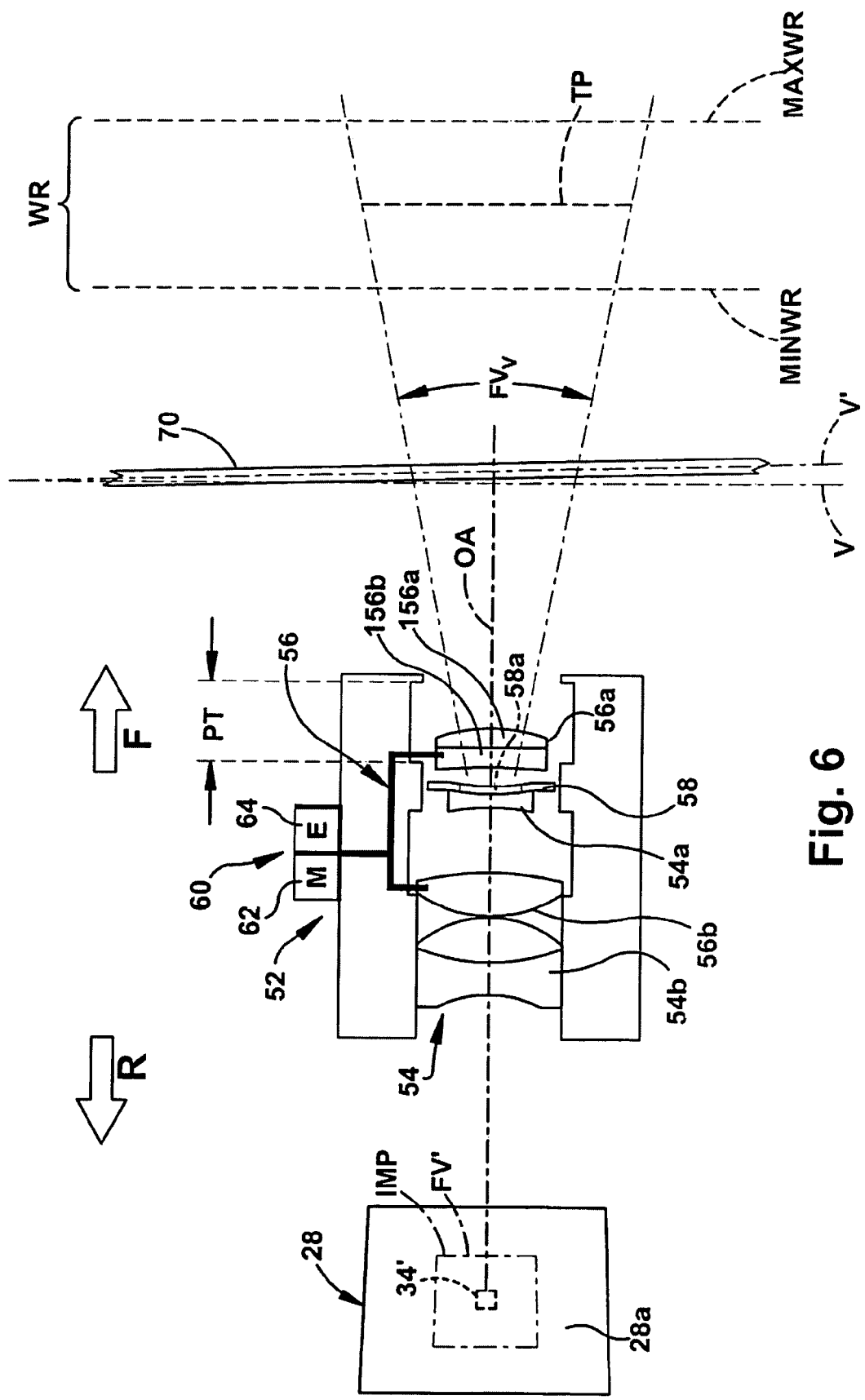
FIG. 6 is a schematic side elevation view of a first exemplary embodiment of a zoom lens assembly of the present invention.

The camera housing 24 is supported within the scanning head interior region 17a in proximity to a transparent window 70 (FIG. 4) defining a portion of a front wall 16f of the scanning head 16b. The window 70 is oriented such that its horizontal axis is substantially parallel to the scanning head horizontal axis H. The vertical axis of the window 70 is tilted slightly to V' (FIG. 6) from the vertical axis V to avoid specula reflection. Specula reflection would occurs if, for example, a virtual image of the illuminated focusing lens 43 of the illumination assembly 40 were to be projected by the exit window 70 within the field of view FV of the imaging system 12. As can be seen in FIG. 6, the axis V' of the window 70 deviates at a very slight angle from the vertical axis V.

Sensor Array 28

The imaging system 12 includes the sensor array 28 of the imaging camera assembly 20. The sensor array 28 comprises a charged coupled device (CCD), a complementary metal oxide semiconductor (CMOS), or other imaging pixel array, operating under the control of the imaging circuitry 22. In one exemplary embodiment, the sensor array 28 comprises a two dimensional (2D) mega pixel CMOS array with a typical size of the pixel array being on the order of 1280×1024 pixels. Each pixel is comprised of a photosensitive element or photosensor that receives light and stores a charge proportional to the intensity of the light received and then is periodically discharged to generate an electrical signal whose magnitude is representative of the charge on the photosensitive element during an exposure period.

The illumination-receiving pixels of the sensor array 28 define a light receiving sensor array surface 28a (best seen in FIG. 4). The sensor array 28 is secured to the printed circuit board 24a, in parallel direction for stability. The sensor array surface 28a is substantially perpendicular to the optical axis OA of the lens assembly 52, that is, a z axis (labeled Z in FIG. 4) that is perpendicular to the sensor array surface 28a would be substantially parallel to the optical axis OA of the lens assembly 52. The pixels of the sensor array surface 28a are disposed substantially parallel to the horizontal axis H of the scanning head 16b.

As is best seen in FIG. 4, the imaging lens assembly 50 focuses light reflected and scattered from the target bar code 34 onto the sensor array surface 28a of the sensor array 28. Thus, the lens assembly 50 focuses an image 34a' (shown schematically in FIG. 6) of the target bar code 34 (assuming it is within the field of view FV) onto the array of pixels comprising the sensor array 28. The field of view focused onto the sensor array surface 28a is shown schematically as FV' in FIG. 6.

Operation of Imaging and Decoding Systems 12, 14

When actuated to read the target bar code 34, the imaging system 12 captures a series of image frames 74 (FIG. 5) which are stored in a memory 84. Each image frame of the series of image frames 74, e.g., image frame 74a, includes a digital representation (shown schematically as 34" in FIG. 5) of the image 34a of the target bar code 34. The decoding system 14 decodes a digitized version of the image bar code 34a.

Electrical signals are generated by reading out of some or all of the pixels of the sensor array 28 after an exposure period. After the exposure time has elapsed, some or all of the pixels of sensor array 28 are successively read out thereby generating an analog signal 76 (FIG. 4). In some sensors, particularly CMOS sensors, all pixels of the sensor array 28 are not exposed at the same time, thus, reading out of some pixels may coincide in time with an exposure period for some other pixels.

The analog image signal 76 represents a sequence of photosensor voltage values, the magnitude of each value representing an intensity of the reflected light received by a photosensor/pixel during an exposure period. The analog signal 76 is amplified by a gain factor, generating an amplified analog signal 78. The imaging circuitry 22 further includes an analog-to-digital (A/D) converter 80. The amplified analog signal 78 is digitized by the A/D converter 80 generating a digitized signal 82. The digitized signal 82 comprises a sequence of digital gray scale values 83 typically ranging from 0-255 (for an eight bit processor, i.e., $2^8$=256), where a 0 gray scale value would represent an absence of any reflected light received by a pixel during an exposure or integration period (characterized as low pixel brightness) and a 255 gray scale value would represent a very high intensity of reflected light received by a pixel during an exposure period (characterized as high pixel brightness).

The digitized gray scale values 83 of the digitized signal 82 are stored in the memory 84. The digital values 83 corresponding to a read out of the sensor array 28 constitute an image frame 74, which is representative of the image projected by the imaging lens assembly 50 onto the sensor array 28 during an exposure period. If the field of view FV of the imaging lens assembly 26 includes the target bar code 34, then a digital gray scale value image 34" of the target bar code 34 would be present in the image frames 74.

The decoding circuitry 14 then operates on the digitized gray scale values 83 of the image frame 74 and attempts to decode any decodable image within the image frame, e.g., the imaged target bar code 34". If the decoding is successful, decoded data 86, representative of the data/information encoded in the target bar code 34 is then output via a data output port 87 and/or some or all of the decoded data 86 is displayed to the operator of the reader 10 via a display 88. Upon achieving a good "read" of the bar code 34, that is, the target bar code 34 was successfully imaged and decoded, a speaker 90 and/or an indicator LED 92 is activated by the bar code reader circuitry 13 to indicate to the user that the target bar code 34 has successfully read, that is, the target bar code 34 has been successfully imaged and the digitized imaged bar code 34" has been successfully decoded. If decoding is unsuccessful, a successive image frame, e.g., image frame 74b is selected and the decoding process is repeated until a successful decode is achieved.

Variable Focus Imaging Lens Assembly 50

The variable focus imaging lens assembly or system 50 projects light reflected and scattered from the target object of interest 32, such as the target bar code 34, onto the sensor array surface 28a, thereby focusing an image 34' of the target bar code 34 (assuming it is within the field of view FV) onto the sensor array surface 28a. As mentioned above, the variable focus imaging lens assembly 50 includes the simplified zoom lens assembly 52, including the group of stationary lenses 54 and the group of movable lenses 56 and an aperture stop 58. The zoom lens assembly 52 operates under the control of a focusing system 66 that moves the movable lens group 56 appropriately along a path of travel PT to properly focus the image 34' of the target bar code onto the sensor array surface 28a.

Advantageously, the zoom lens assembly 52 permits an image plane IMP of the assembly to remain substantially aligned with the sensor array surface 28a, whether the target bar code 34 is near or far from the zoom lens assembly 52. That is, as long as the target bar code 34 is within a working range WR and the field of view FV of the imaging lens assembly 50, when properly focused by the focusing system 66, a suitable, in-focus image 34' of the target bar code 34 will be projected on the sensor array surface 28a.

Regardless of a distance of the target bar code 34 from the zoom lens assembly 52 within the working range WR, the focus and the effective focal length or distance EFL of the zoom lens assembly 22 are simultaneously adjusted, under the control of the focusing system 66, such that an in-focus image 34' of the target bar code 34 will be projected or formed on the sensor array surface 28a. The image plane IMP is a plane at which an in-focus image is formed by the zoom lens assembly 52 and that image plane IMP will be coextensive with the sensor array surface 28a. This is referred to as the sensor array surface 28a being at the conjugate distance, that is, the image plane IMP of the zoom lens assembly 52 is at the sensor array surface 28a.

Through movement of the movable lens group 56, the effective focal length EFL of the zoom lens assembly 52 changes. The effective focal lengths EFL for three different positions of the movable lens group 56 are shown schematically in FIGS. 7-9. Concurrently, the magnification and the horizontal and vertical angles FVH, FVV subtended by the field of view FV also change. While both the horizontal and vertical extent or angles of the field of view change, most important is the change in the angle of the horizontal field of view FVH because a typical 1D bar code has a greater horizontal extent that a vertical extent. The ability to change the effective focal length EFL, magnification and horizontal field of view HFV provided by the zoom lens assembly 52 effectively increases the working range WR of the imaging system 12.

In one exemplary embodiment, the group of stationary lenses 54 includes a first lens 54a, closer to the window 70, and a spaced apart second lens 54b, closer to the sensor array 28 and the group of movable lenses 56 includes a first lens 56a, closer to the window 70 and a spaced apart second lens 56b, closer to the sensor array. For simplicity, a direction toward the window 70 or field of view FV will be defined as the forward direction F (as shown in FIGS. 1 and 6), while a direction toward the sensor array 28 will be defined as the rearward direction R.

The first and second lenses 56a, 56b of the movable lens group 56 move along a path of travel PT (shown schematically in FIG. 6 with respect to the first movable lens 56a). Both lenses 56a, 56b of the movable lens group 56 are constrained to move together when driven by the drive motor 62. Thus, both movable lenses 56a, 56b move linearly at the same time and traverse the same distance, corresponding to the path of travel PT. A typical travel distance along the path of travel PT is on the order of 2-6 millimeters (mm.).

The optical axis of the lenses 54a, 54b, 56a, 56b of the zoom lens assembly 52 and the aperture 58a of the aperture stop 58 are aligned with the optical axis OA of the imaging lens assembly 50. The aperture stop 58 is positioned in proximity to the first stationary lens 54a of the stationary lens group 54 and, preferably, positioned adjacent a side of the first stationary lens 54a facing in the forward direction F.

A target plane TP is defined as a plane orthogonal to the optical axis OA that corresponds to the image plane IMP. That is, if the target bar code 34 is positioned within the field of view FV along a target plane TP, a suitable, in-focus bar code image 34' will be projected at the image plane IMP. A suitable, in-focus bar code image is one that is of sufficient image quality for decoding purposes. Advantageously, with the zoom lens system 52 of the present invention, both focusing and change of the effective focal length EFL occur simultaneously. That is, the image plane IMP remains substantially congruent or aligned with the sensor array surface 28a as the movable lens group 56 is moved by the focusing system 66 along its path of travel PT to focus on the target bar code 34. The effective focal length EFL, the magnification, and the field of view FV of the zoom lens assembly 52 change with movement of the movable lens group 56 such that the target plane TP moves along the optical axis OA between the limits of the working range WR, namely, between a minimum working range MINWR and a maximum working range MAXWR.

Thus, regardless of where the target plane TP is between the minimum working range MINWR and the maximum working range MAXWR, assuming the target bar code 34 is positioned within the field of view FV, an image 34' of the target bar code 34, suitable for decoding, will be projected onto the sensor array surface 28a. Stated another way, if the target bar code 34 were to be moved from a near position to a far position, that is, movement from the near working range MINWR toward the far working range MAX WR, appropriate movement of the movable lens assembly 56 by the focusing system 66, would allow a sharp, high resolution image 34a of the target bar code 34 to continue to be projected onto the sensor array 28 over the entire working range WR.

The lenses 54a, 54b, 56a, 56b and the aperture stop 58 of the zoom lens assembly 52 are supported within a tubular lens housing 57 which permits movement of the first and second movable lenses 56a, 56b along the path of travel PT. The tubular lens housing 57, in turn, is supported by a shroud 26 affixed to the printed circuit board 24a of the camera housing 24. The shroud 26 prevents ambient light from impinging on the sensor array surface 28a.

The group of movable lenses is driven by the drive mechanism assembly 60 which includes the synchronous DC motor 62 and a position encoder 64 which indicates a position of the group of movable lenses 56. By moving the group of movable lenses 56 via the drive motor 62, the effective focal length EFL, magnification, and focus of the zoom lens assembly 52 also is simultaneously adjusted such that the image plane IMP (FIGS. 7-9) remains substantially aligned with the sensor array surface 28a.

The drive mechanism assembly 60 operates under the control of the focusing system 66. As the drive motor 60 moves the group of movable lenses 56 along the path of travel PT, the encoder 64 generates signals indicative of the position of the movable lenses along the path of travel PT. The drive motor 60 and the encoder 64 operate under the control of a focusing system 66. The focusing system 66 moves the movable lens group 56 based on analyzing the series of image frames 74, searching for the digitized imaged bar code 34" in the image frames 74 and finding an acceptable image quality of the digitized imaged bar code 34" that is suitable for decoding. Stated another way, the focusing system 66 analyzes the series of image frames 74 generated by the imaging system 12 and causes the drive mechanism assembly 60 to move the movable lens group 56 such that the target plane TP is aligned with the target bar code 34 and the image plane IMP is align with the sensor array surface 28a such that an in-focus image 34' of the target bar code 34 is projected or formed on the sensor array 34. The focusing system 66 may be part of the imaging system circuitry 22 or it may be embodied in separate circuitry/software that is separate from but electrically coupled to the imaging system circuitry 22, the microprocessor 11a and the memory 84. Various suitable focusing systems 66 which analyze image frame quality and locate target bar code images with captured image frames are know to those of skill in the art. An automatic focusing system suitable for an imaging-based bar code reader is disclosed in U.S. Pat. No. 7,303,131, issued Dec. 4, 2007 to Carlson et al. and entitled "Automatic Focusing System for Imaging-Based Bar Code Reader." The '131 patent is assigned to the assignee of the present invention and is incorporated herein in its entirety by reference. Statistical/autodiscrimination techniques useful in identification of bar code images in captured image frames are disclosed in U.S. Pat. No. 6,405,925, issued Jun. 18, 2002 to He et al. and entitled "Autodiscrimination and Line Drawing Techniques for Code Readers." The '925 patent is assigned to the assignee of the present invention and is incorporated herein in its entirety by reference.

Advantageously, only a single drive motor 62 is required in the simplified zoom lens assembly 52 of the present invention. Moreover, the required accuracy of the drive motor 62 need only be in the range of 100s of microns to keep the images of the field of view in focus and to provide acceptable image quality for the image frames 74. This allows the motor 62 to be a synchronous DC motor, as opposed to a more expensive and accurate stepper motor. This a significant improvement over typical photographic zoom lenses which require accuracy in the range of 10s of micros and may require the utilization of multiple stepper motors, one for focusing and one for variation of the focal length. Of course, it should be understood that the motor 62, if desired, may be a stepper motor.

As can best be seen in FIG. 6-9, in the zoom lens assembly 52, the first and second movable lenses 56a, 56b of the movable lens group 54 are on opposite sides of the first stationary lens 54a of the stationary lens group 54, while the second stationary lens 54b of the stationary lens group 54 is nearest the sensor array 28. The path of travel PT of the movable lens group 56 is substantially parallel to and congruent with the optical axis OA of the lens assembly 50.

In one preferred embodiment, the first movable lens 56a has a positive optical power and may be an achromatic doublet, the first stationary lens 54a has a negative optical power and may be a biconcave lens, the second movable lens 56b has a positive optical power and may be a biconvex lens, while the second stationary lens 54b is an achromatic doublet having little or no optical power. Instead, the second stationary lens 54b functions as a field curvature corrector. In general, field curvature refers to the fact that an imaging lens assembly does not focus a perfectly sharp image of an object of interest such as bar code 34 onto a flat plane that is defined by the sensor array surface 28a. Rather, the sharpest image of the bar code will lie on a curved surface. However, since the surface of the sensor array 28 is planar, it is desirable to minimize the field curvature of the light focused onto the sensor array 28 to as great extent as possible. Generally, the more lenses that are added to an imaging lens assembly, the more the field curvature is flattened or minimized at the sensor array 28. Adding more and more lenses to a lens assembly is not practical, however, because it increases a length of the lens assembly 50 which is highly undesirable. Stated another way, the four lenses 54a, 54b, 56a, 56b of the zoom lens assembly 52 work in combination such that the sum of the lens curvatures multiplied by the respective indices of refraction is substantially zero resulting in a substantially flat field of focus.

In one exemplary embodiment, the first movable lens 56a and the second stationary lens 54b are achromatic doublets which advantageously compensate for chromatic aberrations at desired ranges of wavelengths in the visible spectrum. For example, if the illumination system LED 42 emits illumination in the visible red wavelength range, approximately 620-750 nanometers, then the achromatic doublets would be fabricated to compensate for chromatic aberrations in the red range of the visible spectrum. If not compensated for, chromatic aberration in the red visible wavelength range may otherwise compromise image quality.

As is know to those of skill in the art, the achromatic doublets are fabricated of a positive high-index crown glass cemented to a negative high-index flint glass. For example, with respect to first moving lens 56a, a forward portion 156a is fabricated of positive high-index crown glass, while the rearward portion 156b is fabricated of negative high-index flint glass, both of which have been corrected for chromatic aberrations in desired wavelengths.

In one illustrative embodiment, The first stationary lens 54a and the second movable lens 56b are fabricated of plastic, such as cyclic olefin copolymer (COC) having a high Abbe number to minimize chromatic aberration. These lenses 54a, 56b may be molded out of red plastic to filter out bandwidths of light other than those of the wavelength range of the illumination apparatus 40, e.g., the red LED 42 emitting light in the in the 620-750 nanometer range. Using a limited bandwidth of light allows for a substantial reduction of the complexity of the lens 54a, 54b, 56a, 56b of the zoom lens assembly 52.

If it is desired, based on working conditions of the reader 10, to achromatize the zoom lens assembly 52 over a broader range of wavelengths than provided by the two achromatic doublets 54b, 56a, the lenses 54a and 56b may, alternately, be replaced with achromatic doublets, the first stationary lens 54a being a negative doublet achromatic lens and the second movable lens being a positive doublet achromatic lens, again made out of a combination of flint and crown glass as described above.

Figure 7:
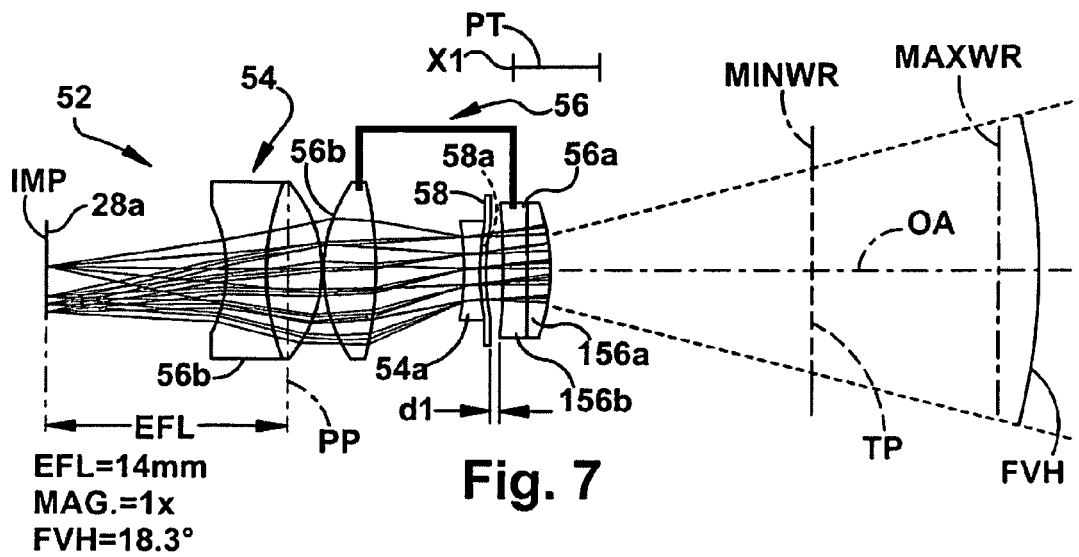
FIG. 7 is a schematic top plan view of the zoom lens assembly of the present invention with a movable lens group positioned at a first end of a path of travel of the movable lens group to provide a minimum effective focal length of the zoom lens assembly and a maximum effective horizontal and vertical fields of view.
Figure 8:
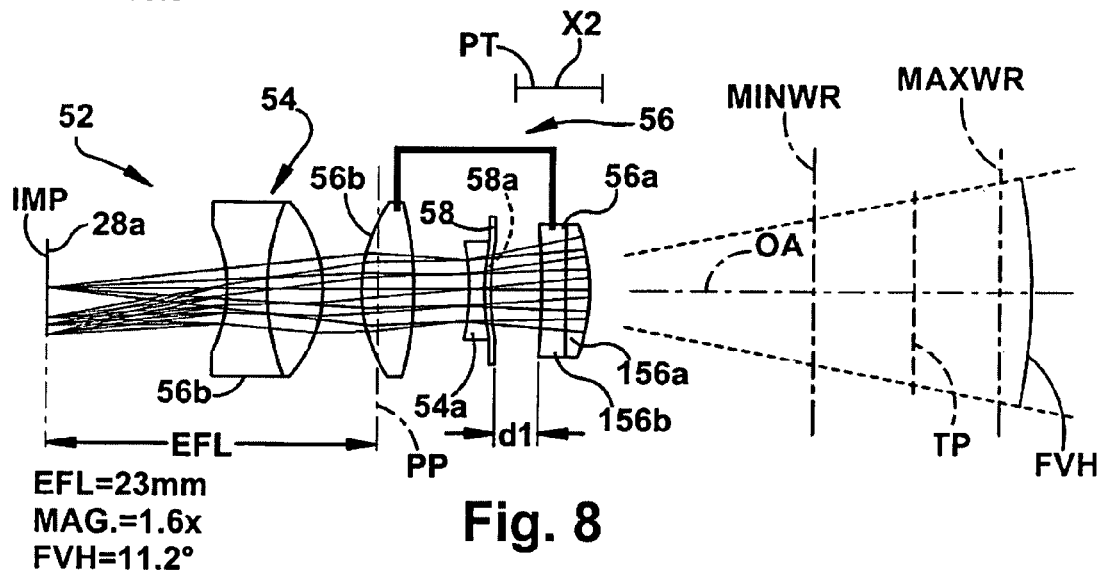
FIG. 8 is a schematic top plan view of the zoom lens assembly of the present invention with the movable lens group positioned at an intermediate position along the path of travel of the movable lens group to provide a intermediate effective focal length of the zoom lens assembly and an intermediate effective horizontal and vertical fields of view.
Figure 9:
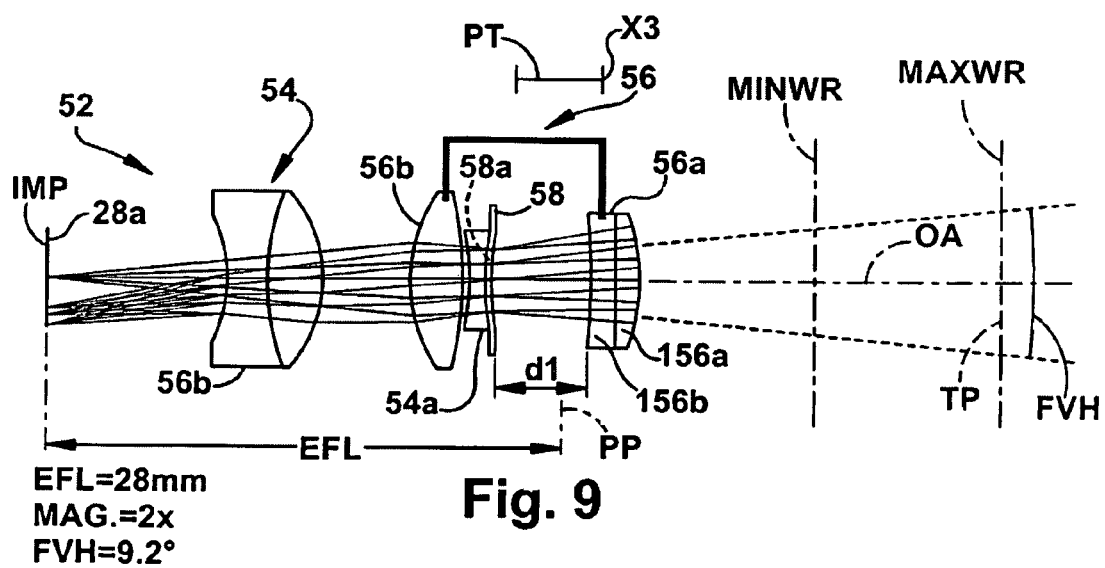
FIG. 9 is a schematic top plan view of the zoom lens assembly of the present invention with the movable lens group positioned at a second end of the path of travel of the movable lens group to provide a maximum effective focal length and minimum effective horizontal and vertical fields of view.

FIGS. 7-9 are examples, for illustrative purposes only, of three zoom conditions of the zoom lens assembly 52. FIG. 7 schematically illustrates a minimum zoom condition for situations where the target bar code 34 is positioned at a closest or minimum value MINWR of the working range WR of the zoom lens assembly 52 and the focusing system 66 would move the movable lens group 56 to an point X1 corresponding to a rearward endpoint along the path of travel PT. FIG. 8 schematically illustrates an intermediate zoom condition where the target bar code 34 is positioned near a middle of the working range WR of the zoom lens assembly 52 and the focusing system 66 would move the movable lens group 56 to an intermediate point X2 along the path of travel PT. Finally, FIG. 9 schematically illustrates a maximum zoom condition for situations where the target bar code 34 is positioned at a far or maximum value MAXWR of the working range WR of the zoom lens assembly 52 and the focusing system 66 would move the movable lens group 56 to a point X3 corresponding to a forward endpoint along the path of travel PT.

The effective focal lengths EFL corresponding to the three positions of the movable lens group 56 are shown schematically in FIGS. 7-9. As can be seen in FIGS. 7-9, the effective focal lengths EFL extend from the image plane IMP (IMP being congruent with the sensor array surface 28a) to a principal plane PP of the zoom lens assembly 52. As can be seen in the illustrative example of FIG. 7, if the target bar code 34 is within the field of view FV at the inner extent MINWR of the working range WR, the effective focal length EFL of the zoom lens assembly 52 is a minimum value, for example, 14 mm., magnification is at a minimum, for example, 1× and an angle of the horizontal field view HFV is at a maximum, for example, 18.3 degrees. In the illustrative example of FIG. 8, if the target bar code 34 is within the field of view FV at an intermediate position along the working range WR, the effective focal length EFL of the zoom lens assembly 52 is an intermediate value, for example, 23 mm., magnification is at an intermediate value, for example, 1.6× and an angle of the horizontal field view HFV is at an intermediate value, for example, 11.2 degrees. Finally, as can be seen in the illustrative example of FIG. 9, if the target bar code 34 is within the field of view FV at the outer extent MAXWR of the working range WR, the effective focal length EFL of the zoom lens assembly 52 is a maximum value, for example, 28 mm., magnification is at a maximum value, for example, 2× and an angle of the horizontal field view HFV is at a minimum, for example, 9.2 degrees. Thus, as the target bar code 34 moves from a near position to a far position within the working range WR, the focusing system 66 simultaneously focuses and moves the movable lens group 56 to keep the bar code 34 in focus thereby causing the effective length EFL and magnification to increase and the field of view FV to decrease. In general, the relation between the effective focal length FL of the zoom lens assembly 52 and the horizontal angle of the field of view FV is as follows:

$$FV \text{ angle} = 2 \times [\text{ArcTan}(\tfrac{1}{2} \times (\text{sensor array width}/EFL))]$$

Thus, it can be seen that as the effective focal length increases, the horizontal angle of the field of view decreases.

For this illustrative embodiment, the optic powers of the lenses of the zoom lens system 52 are as follows: first movable lens 56a—optic power in range of positive +15 to +40 diopters; first stationary lens 54a—optic power in the range of negative −100 to −300 diopters; second movable lens 56b—optic power in the range of positive +50 to +200 diopters; and second stationary lens 54b—optic power in the range of zero to positive +20 diopters.

By way of example, in one exemplary embodiment, the effective focal length or distance EFL may be in the range of 4 to 30 mm. and a ratio of angular change of the field of view FV may be in the range of 1.4 to 2.5×.

As noted above, the aperture stop 58 is adjacent to the first stationary lens 54a and, like the first stationary lens 54a, remains stationary with respect to the sensor array 28. In one exemplary embodiment, the aperture 58a is circular, but may also be elliptical. The aperture stop 58 limits the light impinging upon or received by the first stationary lens element 54a. In other words, the aperture 58a insures that the light that reaches a forwardly facing optic surface of the first stationary lens element 54a is light generally within the bounds of the field of view FV. As is shown schematically in FIG. 10, at any give distance from a front of the zoom lens assembly 52, if a section or slice were taken orthogonal to the optical axis OA, the field of view FV would appear generally rectangular, the extent of the field of view FV being determined by the horizontal field of view angle FVH and the vertical field of view angle FVV. The shape of the field of view FV is determined by the rectangular shape of the sensor array 28 and the focal distance FL of the imaging lens assembly 50.

The entrance pupil diameter (EPD) of the aperture 58a of the aperture stop 58 is defined as an image of the aperture stop 58 as viewed looking rearwardly through the front lens, that is, through the first movable lens 56a. Since the distance d1 (FIGS. 7-9) between the first movable lens 56a and the aperture stop 58 varies with the position of the movable lens group along its path of travel PT, as best seen in FIG. 7-9, while zooming/focusing, the entrance pupil diameter EPD varies with movement of the movable lens group 56.

The f-ratio or f number is the effective focal length EFL divided by the entrance pupil diameter. The higher the f number the less light per unit area reaches the image plane IPL. That is, f/10 would provide more light per unit area than f/15. Thus, as the effective focal length FL of the zoom lens assembly 52 increases, the f number increases and less light per unit area reaches the image plane IPL.

When the target bar code 34 is at the maximum working range MAXWR (FIG. 9), illumination from the illumination apparatus 40 that is reflected/scattered from the target bar code 34 and the target object 32 would be a minimum. Advantageously, under these low illumination conditions, the entrance pupil diameter EPD is a maximum. That is, more reflected/scattered light from the target object 32 and target bar code 34 would be passed through the aperture 58a and focused on the sensor array surface 28a.

Conversely, when the target bar code 34 as at the minimum working range MINWR (FIG. 7), illumination from the illumination apparatus 40 that is reflected/scattered from the target bar code 34 and the target object 32 would be a maximum. Advantageously, under these relatively high illumination conditions, the entrance pupil diameter EPD is reduced. Accordingly, variation in illumination level on the sensor array surface 28a is reduced as less reflected/scattered light from the target object 32 and target bar code 34 would be passed through the aperture 58a and focused on the sensor array surface 28a.

Alternatively, in another exemplary embodiment of the zoom lens assembly of the present invention, the aperture stop 58 may be positioned and supported within the lens housing 57 to move with the movable lens group 56. In such a case, the entrance pupil diameter EPD is fixed and no compensation for illumination levels versus distance is provided.

While the present invention has been described with a degree of particularity, it is the intent that the present invention includes all modifications and alterations from the disclosed embodiment or embodiments falling with the spirit or scope of the appended claims. What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications, and variations that fall within the spirit or scope of the appended claims.

I claim:

1. A variable focus imaging lens assembly for an imaging system of an imaging-based bar code reader for imaging a target object within a field of view of the imaging system, the imaging system generating image frames of the field of view and including an imaging sensor array, the variable focus imaging lens assembly defining an optical axis and comprising:
a zoom lens assembly projecting light from the field of view onto the sensor array;
the zoom lens assembly including a stationary lens group comprising a plurality of stationary lenses stationary with respect to the sensor array and a movable lens group comprising a plurality of movable lenses movable with respect to the sensor array in the imaging-based bar code reader, the movable lens group movable together along a path of travel parallel to the optic axis, at least one lens of the plurality of stationary lenses being intermediate a pair of lenses of the plurality of movable lenses;
as the movable lens group moves in a first direction along the path of travel, a focal length of the imaging lens assembly increasing and an angle of the field of view decreasing and, as the movable lens group moves in a second direction, opposite the first direction, along the path of travel, the focal length of the imaging lens assembly decreasing and the angle of the field of view increasing, an image plane of the imaging lens assembly remaining substantially aligned with the sensor array during movement of the movable lens group; and
a drive mechanism comprising a single drive motor to drive the movable lens group along the path of travel.

2. The variable focus imaging lens assembly of claim 1 wherein the stationary lens assembly includes a first lens comprising a biconcave lens having a negative optic power and a spaced apart second lens comprising an achromatic doublet functioning as a field curvature corrector, the second lens being closer to the sensor array and the first lens being closer to the target bar code.

3. The variable focus imaging lens assembly of claim 2 wherein the movable lens group includes a first lens an achromatic double having a positive optic power and a spaced apart second lens comprising a biconvex lens having a positive optic power, the second lens being closer to the sensor array and the first lens being closer to the target bar code.

4. The variable focus imaging lens assembly of claim 3 wherein the lens assembly includes an aperture stop including an aperture in proximity to the first lens of the stationary lens group.

5. The variable focus imaging lens assembly of claim 4 wherein the aperture stop is stationary with respect to the sensor array.

6. The variable focus imaging lens assembly of claim 4 wherein the aperture stop moves with the movable lens group.

7. The variable focus imaging lens assembly of claim 1 wherein as the movable lens group moves in the first direction along the path of travel, a horizontal angle of the field of view decreases and, as the movable lens group moves in the second direction, opposite the first direction, along the path of travel, the horizontal angle of the field of view increases.

8. The variable focus imaging lens assembly of claim 1 wherein at least one lens of the stationary lens group and the movable lens group is fabricated from red plastic to filter out bandwidths of visible light other than light in the red portion of the visible light spectrum.

9. The variable focus imaging lens assembly of claim 1 wherein the
aperture of the aperture stop is circular in shape.

10. The variable focus imaging lens assembly of claim 2 wherein the motor is a synchronous DC motor.

11. An imaging-based bar code reader comprising:
an imaging system for imaging a target bar code within a field of view of the imaging system, the imaging system generating image frames of the field of view of the imaging system and including an imaging sensor array; and
a variable focus imaging lens assembly for projecting light from the field of view onto the sensor array, the variable focus imaging lens assembly defining an optical path and including:
a zoom lens assembly projecting light from the field of view onto the sensor array;
the zoom lens assembly including a stationary lens group comprising a plurality of stationary lenses stationary with respect to the sensor array and a movable lens group comprising a plurality of movable lenses movable with respect to the sensor array in the imaging-based bar code reader, the movable lens group movable together along a path of travel parallel to the optic axis of the lens assembly, at least one lens of the plurality of stationary lenses being intermediate a pair of lenses of the plurality of movable lenses;

as the movable lens group moves in a first direction along the path of travel, a focal length of the imaging lens assembly increasing and an angle of the field of view decreasing and, as the movable lens group moves in a second direction, opposite the first direction, along the path of travel, the focal length of the imaging lens assembly decreasing and the angle of the field of view increasing, an image plane of the imaging lens assembly remaining substantially aligned with the sensor array during movement of the movable lens group; and a drive mechanism comprising a single drive motor to drive the movable lens group along the path of travel.

12. The imaging-based bar code reader of claim 11 wherein the imaging system includes a focusing system for energizing the drive mechanism to drive the moving lens along the path of travel and analyzing successive image frames to determine an decodable image of the target bar code.

13. The imaging-based bar code reader of claim 11 wherein the stationary lens assembly includes a first lens comprising a biconcave lens having a negative optic power and a spaced apart second lens comprising an achromatic doublet functioning as a field curvature corrector, the second lens being closer to the sensor array and the second lens being closer to the target bar code.

14. The imaging-based bar code reader of claim 13 wherein the movable lens group includes a first lens an achromatic double having a positive optic power and a spaced apart second lens comprising a biconvex lens having a positive optic power, the second lens being closer to the sensor array and the first lens being closer to the target bar code.

15. The imaging-based bar code reader of claim 14 wherein the lens assembly includes an aperture stop including an aperture in proximity to the first lens of the stationary lens group.

16. The imaging-based bar code reader of claim 15 wherein the aperture stop is stationary with respect to the sensor array.

17. The imaging-based bar code reader of claim 15 wherein the aperture stop moves with the movable lens group.

18. The imaging-based bar code reader of claim 11 wherein as the movable lens group moves in the first direction along the path of travel, a horizontal angle of the field of view decreases and, as the movable lens group moves in the second direction, opposite the first direction, along the path of travel, the horizontal angle of the field of view increases.

19. The imaging-based bar code reader of claim 11 wherein at least one lens of the stationary lens group and the movable lens group is fabricated from red plastic to filter out bandwidths of visible light other than light in the red portion of the visible light spectrum.

20. The imaging-based bar code reader of claim 10 wherein the motor is a synchronous DC motor.

21. A method of imaging a target object utilizing an imaging-based bar code reader, the steps of method comprising:
providing an imaging system comprising a camera assembly including a variable focus imaging lens assembly and a sensor array for focusing an image of a target object within a field of view of the camera assembly onto the sensor array;
providing the variable focus imaging lens assembly for focusing light from the field of view onto the sensor array, the variable focus imaging lens assembly defining an optical path and including: a zoom lens assembly focusing light from the field of view onto the sensor array; the zoom lens assembly including a stationary lens group comprising a plurality of stationary lenses stationary with respect to the sensor array and a movable lens group comprising a plurality of movable lenses movable with respect to the sensor array in the imaging-based bar code reader, the movable lens group movable together along a path of travel parallel to the optic axis of the lens assembly, at least one lens of the plurality of stationary lenses being intermediate a pair of lenses of the plurality of movable lenses; as the movable lens group moves in a first direction along the path of travel, a focal length of the imaging lens assembly increasing and a horizontal angle of the field of view decreasing and, as the movable lens group moves in a second direction, opposite the first direction, along the path of travel, the focal length of the imaging lens assembly decreasing and a horizontal angle of the field of view increasing, an image plane of the imaging lens assembly remaining substantially aligned with the sensor array during movement of the movable lens group; and a drive mechanism comprising a single drive motor to drive the movable lens group along the path of travel; and
energizing imaging system and imaging the target object.

22. A variable focus imaging lens assembly for an imaging system of an imaging-based bar code reader for imaging a target object within a field of view of the imaging system, the imaging system generating image frames of the field of view and including an imaging sensor array, the variable focus imaging lens assembly defining an optical axis and comprising:
a zoom lens assembly means focusing light from the field of view onto the sensor array;
the zoom lens assembly means including a stationary lens group means comprising a plurality of stationary lenses stationary with respect to the sensor array and a movable lens group means comprising a plurality of movable lenses movable with respect to the sensor array in the imaging-based bar code reader, the movable lens group means movable together along a path of travel parallel to the optic axis, at least one lens of the plurality of stationary lenses being intermediate a pair of lenses of the plurality of movable lenses,
as the movable lens group means moves in a first direction along the path of travel, a focal length of the imaging lens assembly increasing and a horizontal angle of the field of view decreasing and, as the movable lens group means moves in a second direction, opposite the first direction, along the path of travel, the focal length of the imaging lens assembly decreasing and a horizontal angle of the field of view increasing, an image plane of the imaging lens assembly remaining substantially aligned with the sensor array during movement of the movable lens group; and
a drive mechanism means comprising a single drive motor to drive the movable lens group along the path of travel.

* * * * *